US012715731B2

(12) United States Patent
Koskinen et al.

(10) Patent No.: US 12,715,731 B2
(45) Date of Patent: Aug. 25, 2026

(54) ARRANGEMENT FOR TRANSFERRING TRANSPORTATION INFRASTRUCTURE CONTROL DATA WITHIN A SHARED DATA NETWORK

(71) Applicant: KONE Corporation, Helsinki (FI)

(72) Inventors: Santtu Koskinen, Helsinki (FI); Mikko Piironen, Helsinki (FI); Ari Koivisto, Helsinki (FI); Mikko Mattila, Helsinki (FI); Mikko Heiskanen, Helsinki (FI); Anssi Rantamäki, Helsinki (FI)

(73) Assignee: KONE CORPORATION, Helsinki (FI)

( * ) Notice: Subject to any disclaimer, the term of this patent is extended or adjusted under 35 U.S.C. 154(b) by 1550 days.

(21) Appl. No.: 17/215,772

(22) Filed: Mar. 29, 2021

(65) Prior Publication Data

US 2021/0214183 A1 Jul. 15, 2021

Related U.S. Application Data

(63) Continuation of application No. PCT/FI2018/050746, filed on Oct. 16, 2018.

(51) Int. Cl.
*B66B 1/34* (2006.01)
*B66B 1/46* (2006.01)

(52) U.S. Cl.
CPC ............ *B66B 1/3453* (2013.01); *B66B 1/468* (2013.01); *B66B 2201/4615* (2013.01)

(58) Field of Classification Search
CPC .................. B66B 1/3453; B66B 1/468; B66B 2201/4615
See application file for complete search history.

(56) References Cited

U.S. PATENT DOCUMENTS 6,216,172 B1 4/2001 Kölblin et al.
8,891,423 B2 11/2014 Shaheen et al.
9,537,808 B1 1/2017 Giansiracusa et al.
(Continued)

FOREIGN PATENT DOCUMENTS

CN 103647782 B 2/2017
EP 2 258 649 A1 12/2010
(Continued)

OTHER PUBLICATIONS

CISCO, "Connected Rail Solution Design Guide," URL: https://www.cisco.com/c/dam/en_us/solutions/industries/docs/cts-dg.pdf, Nov. 2016, XP055613499, 42 pages total.
(Continued)

*Primary Examiner* — Eduardo Colon Santana
(74) *Attorney, Agent, or Firm* — Birch, Stewart, Kolasch & Birch, LLP

(57) ABSTRACT

An arrangement for connecting transportation infrastructure peripheral devices, such as elevator and escalator peripheral devices, to a transportation infrastructure devices, such as elevator, using a building network is disclosed. In the arrangement a virtually dedicated channel for communication between elevator and escalator peripheral devices is created. The channel is used for transmitting signals, such as elevator calls, so that there is no need to use a dedicated and separated network elevator and escalator peripheral devices.

11 Claims, 2 Drawing Sheets

(56) References Cited

U.S. PATENT DOCUMENTS

| | | | | |
|---|---|---|---|---|
| 2009/0022131 | A1 | 1/2009 | Rusanen et al. | |
| 2012/0066356 | A1 | 3/2012 | Nguyen et al. | |
| 2012/0145487 | A1 | 6/2012 | Yoo | |
| 2013/0116835 | A1 * | 5/2013 | Nowel | F24F 11/64 700/278 |
| 2014/0045479 | A1 | 2/2014 | Shinada et al. | |
| 2016/0337181 | A1 | 11/2016 | Cathrow et al. | |
| 2018/0099840 | A1 * | 4/2018 | Armistead | G05B 19/042 |
| 2018/0179021 | A1 * | 6/2018 | Uchida | B66B 1/3423 |
| 2020/0087106 | A1 * | 3/2020 | Kottur | B66B 1/3461 |
| 2021/0229952 | A1 * | 7/2021 | Manica | B66B 1/2458 |
| 2022/0239591 | A1 * | 7/2022 | Barton | H04L 45/22 |
| 2024/0417215 | A1 * | 12/2024 | Julakanti | H04W 8/26 |

FOREIGN PATENT DOCUMENTS

| | | | |
|---|---|---|---|
| EP | 2587725 | A1 | 5/2013 |
| EP | 3 318 523 | A1 | 5/2018 |
| EP | 3 062 541 | A1 | 8/2018 |
| EP | 3 381 851 | A2 | 10/2018 |
| EP | 3 381 852 | A2 | 10/2018 |
| WO | WO 2007/061405 | A2 | 5/2007 |
| WO | WO 2007/093665 | A1 | 8/2007 |
| WO | WO 2010/087815 | A1 | 8/2010 |
| WO | WO 2012/118711 | A2 | 9/2012 |
| WO | WO 2014/122357 | A1 | 8/2014 |
| WO | WO 2015/084396 | A1 | 6/2015 |
| WO | WO 2015/177020 | A1 | 11/2015 |
| WO | WO 2018/050654 | A1 | 3/2018 |

OTHER PUBLICATIONS

CISCO, "Understanding CHAP authentication," URL: https://www.cisco.com/c/en/us/support/docs/wan/point-to-point-protocol-ppp/25647-understanding-ppp-chap.pdf, Oct. 21, 2015, XP055600402, 10 pages total.

International Search Report (PCT/ISA/210) issued in PCT/FI2018/050746 mailed on Sep. 24, 2019.

International Search Report for International Application No. PCT/EP2018/078149, dated Mar. 28, 2019.

International Search Report for International Application No. PCT/FI2018/050742, dated Jul. 18, 2019.

International Search Report for International Application No. PCT/FI2018/050743, dated Jul. 5, 2019.

International Search Report for International Application No. PCT/FI2018/050744, dated Sep. 4, 2019.

International Search Report for International Application No. PCT/FI2018/050745, dated Jul. 8, 2019.

International Search Report for International Application No. PCT/FI2018/050747, dated Jul. 8, 2019.

International Search Report for International Application No. PCT/FI2018/050748, dated Jul. 5, 2019.

Written Opinion (PCT/ISA/237) issued in PCT/FI2018/050746 mailed on Sep. 24, 2019.

Written Opinion of the International Searching Authority for International Application No. PCT/EP2018/078149, dated Mar. 28, 2019.

Written Opinion of the International Searching Authority for International Application No. PCT/FI2018/050742, dated Jul. 18, 2019.

Written Opinion of the International Searching Authority for International Application No. PCT/FI2018/050743, dated Jul. 5, 2019.

Written Opinion of the International Searching Authority for International Application No. PCT/FI2018/050744, dated Sep. 4, 2019.

Written Opinion of the International Searching Authority for International Application No. PCT/FI2018/050745, dated Jul. 8, 2019.

Written Opinion of the International Searching Authority for International Application No. PCT/FI2018/050747, dated Jul. 8, 2019.

Written Opinion of the International Searching Authority for International Application No. PCT/FI2018/050748, dated Jul. 5, 2019.

* cited by examiner

ARRANGEMENT FOR TRANSFERRING TRANSPORTATION INFRASTRUCTURE CONTROL DATA WITHIN A SHARED DATA NETWORK

CROSS REFERENCE TO RELATED APPLICATIONS

This application is a Continuation of PCT International Application No. PCT/FI2018/050746, filed on Oct. 16, 2018, which is hereby expressly incorporated by reference into the present application.

DESCRIPTION OF BACKGROUND

The following description relates to transportation infrastructure in buildings and public places. More particularly the description relates to allowing the use of a building network shared with other network users for transferring signals between transportation infrastructure peripheral devices, such as, elevator and escalator peripheral devices and corresponding transportation infrastructure controllers.

Modern elevators are network connected devices that can be accessing resources from one or more external entities providing services to elevators and escalators for the benefit of passengers. In addition to the improvement of passenger comfort and efficiency, the network connectivity may be used for several other purposes, for example entertainment or data collection.

A common approach for providing network connectivity is to use specially designed dedicated network technologies that are configured to reliably and timely provide safety and elevator control related messages to the receiving network components. In many occasions these special purpose dedicated networks use technologies that are compatible with old cables and old technology of elevators. Special purpose dedicated networks have been easy to configure and maintain. Thus, they have been preferred solutions and under continuous development.

Nowadays the network connectivity does not only relate to external devices connected to an elevator system. Even some components that are relevant or even essential for normal operation of an elevator or escalator group can be connected using data communication networks.

In this description, these components are referred to as applications. The applications may be implemented as hardware or software. Many applications involving hardware also include software, and software applications may be executed in a server or central computing resource. Thus, an application can be described as an entity providing services to requesting clients. An example of an application is a group controller. An example of a client is a destination operating panel installed in an elevator arrangement.

Current elevators use a network arrangement that is in this description referred to as transportation infrastructure control network (TICN). A TICN can be a combination of wired and wireless network solutions.

The TICN is used for connecting elevator and escalator components together. Particularly, they are used for connecting Elevator Escalator Peripheral Devices (EEPD) to the elevator arrangement. Correspondingly TICN may be used for connecting other transportation infrastructure peripheral devices together. When new peripheral devices, which are here discussed as an example of client entities, are added to the elevator or escalator arrangement, the peripheral devices must be detected and connected to the network appropriately. The same applies when already existing peripheral devices need to be disconnected and then reconnected to the arrangement. Further needs may arise from other possible reorganizing related tasks.

Even if the TICN is most commonly used for data communications related to elevators and escalators, it can also be used for controlling, for example, access gates, display panels and the like. It is not necessary that the TICN is coupled with elevators and escalators, and the TICN can be used, for example, for access gates only. In this application the TICN is understood to be a separate physical network originally designed for transportation infrastructure purposes only.

In addition to applications and elevator/escalator peripheral devices, also external devices and generic peripheral devices may be attached to the elevator and escalator network.

As discussed above, attaching peripheral devices and other devices to a TICN may require a complicated configuration process. Conventionally, the configuration process has been made easier by using pre-configured devices; however, in modern elevator arrangements this is a difficult task as the elevator system may be a part of a building network that is complicated and continuously changed. Furthermore, these devices are commonly installed in spaces with limited access. An example of such limited space is the elevator shaft. Typically, working in elevator shafts requires a special qualification for elevator environment.

When networks are built into modern buildings, the number of network elements, such as switches, may be very high. For example, it is possible that each elevator shaft has a network switch or router on each landing floor level. These network switches form a complicated network topology. Thus, there is a need for configuring these network elements that provide a base for a TICN.

SUMMARY

An arrangement for connecting transportation infrastructure peripheral devices, such as elevator and escalator peripheral devices, to a transportation infrastructure devices, such as elevator, using a building network is disclosed. In the arrangement a virtually dedicated channel for communication between elevator and escalator peripheral devices is created. The channel is used for transmitting signals, such as elevator calls, so that there is no need to use a dedicated and separated network for elevator and escalator peripheral devices.

In an aspect a transportation infrastructure arrangement is disclosed. The transportation infrastructure arrangement comprises at least one elevator; at least one elevator connected device; and a building data communications network, wherein the building data communications network is a shared data communication network, wherein the at least one elevator connected device is configured to communicate with said at least one elevator using the building data communication network.

It is beneficial that general purpose building networks can be used for transferring elevator control data. The use of general purpose building networks reduces the need of physical cabling in buildings that may be difficult to implement in some locations. Furthermore, as existing networks can be used, the maintenance of physical networks is reduced, and this leads to cost savings. If a wireless network is used, the arrangement reduces the number of different wireless networks and reduces interference among wireless networks that are available in the building.

In an implementation the building data communication network is Ethernet. It is beneficial to use Ethernet, as it is well known and an established implementation. As compared to special purpose dedicated networks that are commonly used in elevators, the costs are reduced as the components are usable in a wider range of applications.

In an implementation the at least one elevator connected device is an elevator calling device. It is beneficial that the elevator calling devices can be implemented in different locations without a need for additional cabling. When the calling device is located at a distance from the elevator, the elevator system has some time to perform scheduling of the elevators. This is beneficial, as stopping of the elevators will increase the travelling time.

In an implementation the at least one elevator connected device is an operation panel of a destination control system. It is beneficial to use general building networks to provide connectivity to various different types of elevator connected devices. This provides freedom for choosing the location of the device and reduces costs when no special purpose network connection is needed.

In an implementation the communication between the at least one elevator and at least one elevator connected device is configured to use a dedicated channel in the building data communications network. It is beneficial to virtually separate the channel between the elevator and elevator connected devices. This improves data security and working reliability.

In an implementation the dedicated channel is provided by separating the channel using a virtual LAN or security group tagging. Virtual LANs and security group tagging provide a number of advantages, such as ease of administration, confinement of broadcast domains, reduced broadcast traffic, and enforcement of security policies. Virtual LANS also provide the advantage of enabling logical grouping of end-stations that are physically dispersed in a network.

In an implementation the dedicated channel is provided by overlaying the channel using a virtual extensible LAN. The benefits of virtualization by overlaying include that virtualization is performed at the network edge, while the remainder of the L2/L3 network remains unchanged and does not need any configuration change in order to support the virtualization of the network.

The methods, devices and systems discussed above are beneficial, as they increase the possibility to use an existing building network for providing network connectivity to devices, such as elevator and escalator peripheral devices, belonging to elevator and escalator installations. In a new building, it reduces costs by removing a need to build two different networks for the building. When modernizing older elevators it provides a possibility to modernize the elevator or escalator without a need to build a dedicated data communications network.

BRIEF DESCRIPTION OF THE DRAWINGS

The accompanying drawings, which are included to provide a further understanding of the arrangement for transferring elevator and escalator control data within a shared network and constitute a part of this specification, illustrate example embodiments and together with the description help to explain the principles of the arrangement for transferring elevator and escalator control data within a shared network. In the drawings.

DETAILED DESCRIPTION

Reference will now be made in detail to the embodiments, examples of which are illustrated in the accompanying drawings.

In the following description, an elevator is used as an example. The arrangement is also suitable for escalators and systems comprising both elevators and escalators. Furthermore, the arrangements involving other transportation infrastructure arrangements may be used. Examples of such include access gates, doors, lighting, information screens and similar.

Figure 1:
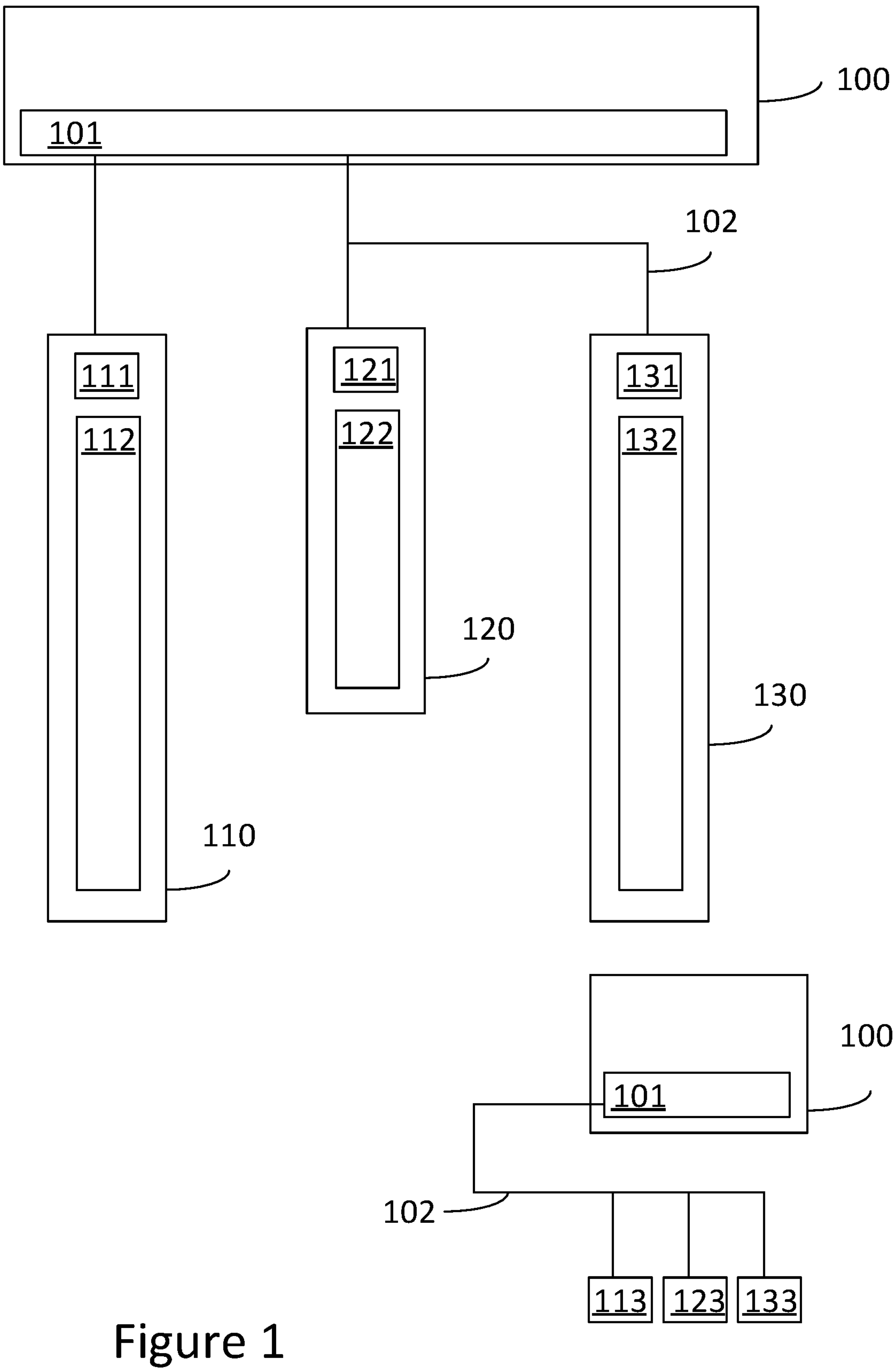
FIG. 1 is a block diagram of an example network used in an elevator and escalator environment.

In FIG. 1 a block diagram of an example network arrangement that can be used in an elevator and escalator environment is shown. The arrangement shown in the figure comprises three elevators 110, 120, 130 that are connected to a building network 100. The building network 100 is shown in two different locations; however, the same building network 100 is illustrated. In the example the building network uses cabling 101 that is used to connected relevant network elements together.

Each of the elevators comprise a machine room 111, 121, 131 including controlling electronics with a network connection. Machine rooms are shown for illustrative purposes only and the arrangement can be applied also to a so called machine roomless elevator. The machine rooms 111, 121, 131 operate elevators 112, 122, 132. Cabling 102 is used to connect the elevators to the building network 100.

Devices 113, 123, 133 are devices that are connected to the elevators 110, 120, 130. For example, these devices can be calling panels that passengers use for calling an elevator, and possibly for indicating the destination. These devices may also be information panels or any other devices that are important for elevator use. Devices 113, 123, 133 are connected to the same building network 100 as the elevators 110, 120, 130. They are using the same or similar cabling 101, 102 for the connection. The cabling as discussed here should be understood to be general cabling used in a building, and it can be implemented by using several different cables. Furthermore, although cabling is discussed here, it is possible to implement at least a portion of the building network using wireless connection means.

In the arrangement of FIG. 1 the devices are connected to a transportation infrastructure control network through a building network. The building network separates elevator related data through any know method, for example VLAN/SGT separation or overlay, such as a VXLAN solution. End-to-end encryption of communication may be required depending on customer/internal requirements. A similar method can be applied to other devices, for example escalator communications requiring access to the TICN. Instead of known methods it is possible to build a special purpose network arrangement so that the elevator related data is securely separated from the building data.

Figure 2:
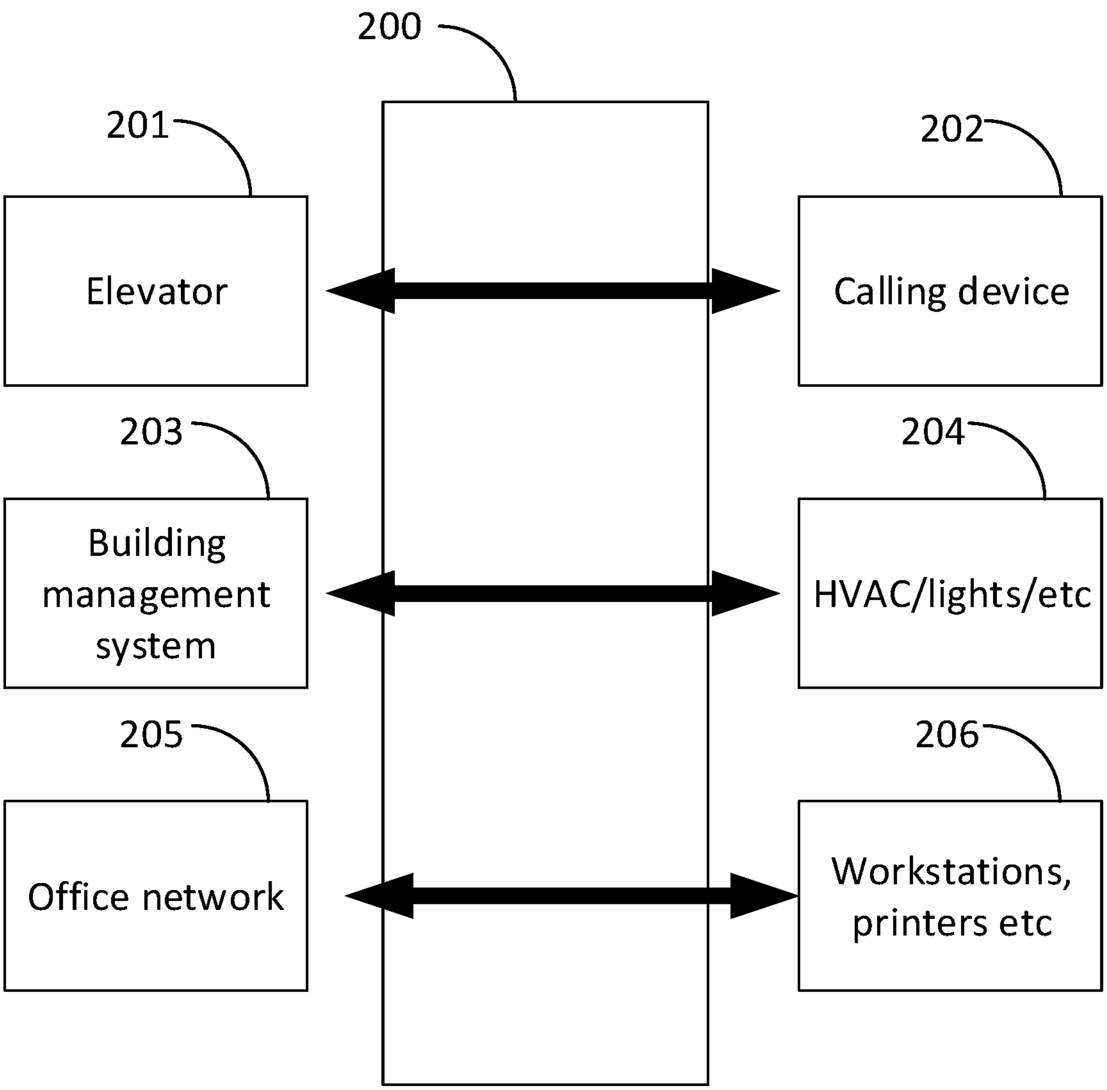
FIG. 2 is a diagram illustrating the working principles of an example network similar to the one of FIG. 1.

In FIG. 2 it is shown how the traffic in a building network is organized. The building network 200 may be similar to the building network 100 of FIG. 1. The building network of this example is configured to perform all data communications in the building. Thus, the elevator 201 is discussing with the calling device of the destination control system 202 over the building network 200. Calling panels for the destination control system 202 can be located directly in the vicinity of the elevator; however, it is sometimes beneficial to keep the panels at a distance from the actual elevators so that people waiting in front of the elevators do not block each other. Furthermore, typically the requests cannot be fulfilled immediately, so it is beneficial if the request can be placed a little bit in advance.

In FIG. 2 a building management system 203 operating building facilities 204 is shown. In addition to these two, an office network 205 connected to office facilities 206 is shown. These two arrangements are separate from the elevator arrangement and are secured so that it is not possible to access elevators from the office network.

The arrangement described above is often limited to the use of signalization devices, such as elevator and escalator peripheral devices similar to the devices described above, relating to the safety of the elevator, as the safety related communications may be regulated by authorities. The signalization devices and other devices that do not require a real time response within a given time frame may be implemented using the building network.

In the arrangement described above the communication between the elevator 201 and elevator and escalator peripheral devices is arranged in a virtually dedicated communication channel. Such a dedicated channel may be provided, for example, by separating the channel using a virtual LAN or security group tagging. Another possibility is, for example, to use so called overlaying of the channel using a virtual extensible LAN.

The above described methods may be implemented as computer software which is executed in a computing device that can be connected to a data communication network. When the software is executed in a computing device, it is configured to perform the above described inventive method. The software is embodied on a computer readable medium, so that it can be provided to the computing device, such as the elevator and escalator network controller of FIG. 1.

As stated above, the components the of exemplary embodiments can include a computer readable medium or memories for holding instructions programmed according to the teachings of the present embodiments and for holding data structures, tables, records, and/or other data described herein. The computer readable medium can include any suitable medium that participates in providing instructions to a processor for execution. Common forms of computer-readable media can include, for example, a floppy disk, a flexible disk, hard disk, magnetic tape, any other suitable magnetic medium, a CD-ROM, CD±R, CD±RW, DVD, DVD-RAM, DVD±RW, DVD±R, HD DVD, HD DVD-R, HD DVD-RW, HD DVD-RAM, Blu-ray Disc, any other suitable optical medium, a RAM, a PROM, an EPROM, a FLASH-EPROM, any other suitable memory chip or cartridge, a carrier wave or any other suitable medium from which a computer can read.

It is obvious to a person skilled in the art that with the advancement of technology, the basic idea of the arrangement for transferring elevator and escalator control data within a shared network may be implemented various ways. The arrangement for transferring elevator and escalator control data within a shared network and its embodiments are thus not limited to the examples described above; instead they may vary within the scope of the claims.

The invention claimed is:

1. A transportation infrastructure arrangement comprising:

at least one elevator;

at least one elevator connected device; and a building data communications network, wherein the building data communications network is a shared data communication network, wherein the at least one elevator connected device is configured to communicate with said at least one elevator using a virtually dedicated communication channel within the building data communication network for real-time, safety-related elevator control and operational data, and wherein the virtually dedicated communication channel is provided by separating the channel using a virtual LAN (VLAN) or security group tagging (SGT), so that the real-time, safety-related elevator control and operational data is securely separated from general building data.

2. The transportation infrastructure arrangement according to claim 1, wherein the building data communication network is Ethernet.

3. The transportation infrastructure arrangement according to claim 2, wherein the at least one elevator connected device is an elevator calling device.

4. The transportation infrastructure arrangement according to claim 2, wherein the at least one elevator connected device is an operation panel of a destination control system.

5. The transportation infrastructure arrangement according to claim 2, wherein the virtually dedicated communication channel is provided by overlaying the channel using a virtual extensible LAN.

6. The transportation infrastructure arrangement according to claim 1, wherein the at least one elevator connected device is an elevator calling device.

7. The transportation infrastructure arrangement according to claim 6, wherein the at least one elevator connected device is an operation panel of a destination control system.

8. The transportation infrastructure arrangement according to claim 6, wherein the virtually dedicated communication channel is provided by overlaying the channel using a virtual extensible LAN.

9. The transportation infrastructure arrangement according to claim 1, wherein the at least one elevator connected device is an operation panel of a destination control system.

10. The transportation infrastructure arrangement according to claim 9, wherein the virtually dedicated communication channel is provided by overlaying the channel using a virtual extensible LAN.

11. The transportation infrastructure arrangement according to claim 1, wherein the virtually dedicated communication channel is provided by overlaying the channel using a virtual extensible LAN.

* * * * *